(12) United States Patent
Niwayama et al.

(10) Patent No.: US 7,428,102 B2
(45) Date of Patent: Sep. 23, 2008

(54) OPTICAL ELEMENT

(75) Inventors: Akira Niwayama, Sunnyvale, CA (US); Eddie Azuma, Cupertino, CA (US)

(73) Assignee: Enplas Corporation, Saitama (JP)

( * ) Notice: Subject to any disclaimer, the term of this patent is extended or adjusted under 35 U.S.C. 154(b) by 0 days.

(21) Appl. No.: 11/298,151

(22) Filed: Dec. 9, 2005

(65) Prior Publication Data

US 2007/0146867 A1    Jun. 28, 2007

(51) Int. Cl.
  G02B 5/28 (2006.01)
(52) U.S. Cl. .................... 359/590; 359/589; 359/584; 385/129
(58) Field of Classification Search ............... 359/589, 359/584, 590; 385/129
  See application file for complete search history.

(56) References Cited

U.S. PATENT DOCUMENTS 6,404,958 B1 * 6/2002 Boye et al. ............... 385/47
6,465,105 B1 * 10/2002 Johnson et al. ............ 428/426
2002/0051603 A1 * 5/2002 Hajjar et al. ............... 385/24
2002/0080457 A1 * 6/2002 Nakanishi et al. .......... 359/189

FOREIGN PATENT DOCUMENTS

JP  2004-354752  12/2004
JP  2005-084188   3/2005

* cited by examiner

Primary Examiner—Joshua L Pritchett
(74) Attorney, Agent, or Firm—William L. Androlia; H. Henry Koda (57) ABSTRACT

An optical element which includes an optical block having a cavity part formed on an optical path and an inclined face formed in an internal face of the cavity part at a prescribed inclining angle with respect to a traveling direction of light. Multilayer films of the same structure are formed at least on the internal face of the cavity part and on an interface between a light incident end and/or emission end of the optical block and outside. The multilayer film formed on the incline face in the internal face of the cavity part has at least a wavelength selecting function for light to be used.

6 Claims, 12 Drawing Sheets

| Layer | Coating material | Thicness of layer (nm) | Optical Thickness (nm) |
|---|---|---|---|
| 1 | Al$_2$O$_3$ | 48.1 | 76.0 |
| 2 | TiO$_2$ | 20.1 | 45.7 |
| 3 | Al$_2$O$_3$ | 46.0 | 72.7 |
| 4 | TiO$_2$ | 192.3 | 437.5 |
| 5 | Al$_2$O$_3$ | 275.1 | 434.9 |
| 6 | TiO$_2$ | 176.2 | 400.8 |
| 7 | Al$_2$O$_3$ | 239.9 | 379.3 |
| 8 | TiO$_2$ | 176.1 | 400.7 |
| 9 | Al$_2$O$_3$ | 231.6 | 366.1 |
| 10 | TiO$_2$ | 168.7 | 383.8 |
| 11 | Al$_2$O$_3$ | 244.5 | 386.5 |
| 12 | TiO$_2$ | 155.8 | 354.5 |
| 13 | Al$_2$O$_3$ | 256.6 | 405.7 |
| 14 | TiO$_2$ | 151.8 | 345.3 |
| 15 | Al$_2$O$_3$ | 249.9 | 395.1 |
| 16 | TiO$_2$ | 158.7 | 361.1 |
| 17 | Al$_2$O$_3$ | 241.3 | 381.5 |
| 18 | TiO$_2$ | 157.7 | 358.9 |
| 19 | Al$_2$O$_3$ | 249.4 | 394.4 |
| 20 | TiO$_2$ | 151.9 | 345.7 |
| 21 | Al$_2$O$_3$ | 250.9 | 396.6 |
| 22 | TiO$_2$ | 155.5 | 353.9 |
| 23 | Al$_2$O$_3$ | 243.0 | 384.2 |
| 24 | TiO$_2$ | 158.4 | 360.3 |
| 25 | Al$_2$O$_3$ | 244.8 | 387.1 |
| 26 | TiO$_2$ | 153.8 | 349.9 |
| 27 | Al$_2$O$_3$ | 252.1 | 398.6 |
| 28 | TiO$_2$ | 152.8 | 347.6 |
| 29 | Al$_2$O$_3$ | 246.5 | 389.6 |
| 30 | TiO$_2$ | 159.0 | 361.7 |
| 31 | Al$_2$O$_3$ | 241.9 | 382.5 |
| 32 | TiO$_2$ | 156.0 | 355.0 |
| 33 | Al$_2$O$_3$ | 254.6 | 402.5 |
| 34 | TiO$_2$ | 151.0 | 343.5 |
| 35 | Al$_2$O$_3$ | 250.4 | 395.9 |
| 36 | TiO$_2$ | 163.6 | 372.1 |
| 37 | Al$_2$O$_3$ | 229.6 | 362.9 |
| 38 | TiO$_2$ | 173.3 | 394.3 |
| 39 | Al$_2$O$_3$ | 230.9 | 365.1 |
| 40 | TiO$_2$ | 169.2 | 385.0 |
| 41 | Al$_2$O$_3$ | 254.8 | 402.8 |
| 42 | TiO$_2$ | 160.6 | 365.5 |
| 43 | Al$_2$O$_3$ | 289.8 | 458.2 |
| 44 | TiO$_2$ | 131.4 | 298.9 |
| 45 | Al$_2$O$_3$ | 156.1 | 246.9 |

| Layer | Coating material | Thickness of layer (nm) | Optical layer (nm) |
|---|---|---|---|
| 1 | $TiO_2$ | 16.0 | 36.3 |
| 2 | $SiO_2$ | 54.8 | 79.4 |
| 3 | $TiO_2$ | 210.0 | 477.3 |
| 4 | $SiO_2$ | 313.5 | 453.8 |
| 5 | $TiO_2$ | 178.0 | 404.5 |
| 6 | $SiO_2$ | 273.8 | 396.3 |
| 7 | $TiO_2$ | 175.3 | 398.4 |
| 8 | $SiO_2$ | 265.5 | 384.4 |
| 9 | $TiO_2$ | 170.8 | 388.0 |
| 10 | $SiO_2$ | 267.2 | 386.8 |
| 11 | $TiO_2$ | 166.4 | 378.1 |
| 12 | $SiO_2$ | 272.4 | 394.3 |
| 13 | $TiO_2$ | 161.9 | 368.0 |
| 14 | $SiO_2$ | 273.9 | 396.6 |
| 15 | $TiO_2$ | 163.3 | 371.0 |
| 16 | $SiO_2$ | 267.1 | 386.6 |
| 17 | $TiO_2$ | 165.4 | 375.9 |
| 18 | $SiO_2$ | 266.4 | 385.6 |
| 19 | $TiO_2$ | 164.5 | 373.7 |
| 20 | $SiO_2$ | 266.4 | 385.7 |
| 21 | $TiO_2$ | 165.2 | 375.3 |
| 22 | $SiO_2$ | 265.0 | 383.7 |
| 23 | $TiO_2$ | 165.1 | 375.1 |
| 24 | $SiO_2$ | 266.9 | 386.3 |
| 25 | $TiO_2$ | 163.2 | 370.9 |
| 26 | $SiO_2$ | 273.0 | 395.2 |
| 27 | $TiO_2$ | 159.3 | 362.0 |
| 28 | $SiO_2$ | 277.6 | 401.8 |
| 29 | $TiO_2$ | 161.5 | 367.1 |
| 30 | $SiO_2$ | 267.9 | 387.8 |
| 31 | $TiO_2$ | 169.1 | 384.3 |
| 32 | $SiO_2$ | 261.2 | 378.1 |
| 33 | $TiO_2$ | 170.5 | 387.5 |
| 34 | $SiO_2$ | 268.0 | 388.0 |
| 35 | $TiO_2$ | 169.4 | 385.0 |
| 36 | $SiO_2$ | 280.4 | 405.9 |
| 37 | $TiO_2$ | 169.6 | 385.4 |
| 38 | $SiO_2$ | 306.5 | 443.8 |
| 39 | $TiO_2$ | 170.3 | 386.9 |
| 40 | $SiO_2$ | 158.3 | 229.2 |

FIG.12

OPTICAL ELEMENT

BACKGROUND OF THE INVENTION

1. Field of the Invention

The present invention relates to an optical element and, particularly, to an optical element that is preferably used for transmitting and receiving optical information.

2. Description of the Related Art

Conventionally, as an optical element with wavelength-selectivity which is capable of reflecting or transmitting light by selecting wavelength of the light, there has been known an optical element comprising an optical filter that reflects or transmits light in accordance with wavelength of the light to be used.

Such optical element is used for a wavelength multiplex transmitting/receiving module and the like for separating or synthesizing light waves, which is mounted to a single-core bidirectional transmission system in an optical fiber communication system.

Examples of invention relating to such optical element are those described in Patent Literature 1 and Patent Literature 2.

These documents disclose inventions which provide effects such as reduction in the number of components, reduction in core adjusting steps, simplification of assembly, downsizing, reduction in cost, etc.

Conventionally, the above-described optical filter has been obtained by forming a dielectric multilayer film on a substrate.

[Patent Literature 1] Japanese Patent Unexamined Publication 2004-354752

[Patent Literature 2] Japanese Patent Unexamined Publication 2005-84188

In accordance with a recent spread of optical fiber communication technology and an increase in demand thereof, there are more and more requests to achieve reduction in the number of components, downsizing, low cost, and improved mass-productivity in an optical element that performs transmission and reception of optical information.

However, the inventions described in Patent Literatures 1 and 2 face a problem of productivity since the inventions require a complicated work wherein an optical filter and an optical block (housing or the like) for holding the optical filter are manufactured separately, and the optical filter is placed at a prescribed position of the optical block.

If an optical filter constituted of a multilayer film is formed on the surface of an optical block by a film-forming method, a work for placing the optical filter can be omitted. However, there is a multilayer film formed also on other surfaces of the optical block than the surface where the optical filter is to be formed, which may result in deterioration of the optical property of the optical element.

For example, if a multilayer film is formed on a lens face of an optical block that comprises the lens face on the incident end or emission end of light, there may hinder light incident on the lens face or light emission therefrom depending on the property of the multilayer film.

Furthermore, in order to carry out the work for placing the optical filter easily but properly, it is inevitable that the optical filter placing area of the optical block has a size of certain extent. Thus, it has been difficult to achieve more downsizing than that of the conventional cases.

Moreover, conventionally, an antireflection coating has been formed on the optical block for improving the optical property of the optical element. In the case of forming such antireflection coating, the number of components and cost is more increased, and mass-production becomes more difficult.

As a result, there is a conventional problem that it cannot sufficiently meet the demands for achieving more reduction in the number of components, downsizing, low cost, and an improvement in the mass-productivity.

SUMMARY OF THE INVENTION

The present invention has been designed to overcome the aforementioned problems. An object of the present invention therefore is to provide an optical element that can achieve more reduction in the number of components, downsizing, low cost, and an improvement in the mass-productivity while maintaining an excellent optical property.

In order to achieve the aforementioned object, an optical element according to a first aspect of the present invention is an optical element with a wavelength selecting function for reflecting or transmitting light by selecting wavelength of the light, which comprises: an optical block having a cavity part with an opening formed on an optical path and an inclined face formed in an internal face of the cavity part at a prescribed inclining angle with respect to a traveling direction of light, wherein multilayer films of the same structure are formed at least on the internal face of the cavity part and on an interface between light incident end and/or emission end of the optical block and outside, the multilayer film formed on the inclined face in the internal face of the cavity part has the wavelength selecting function for light to be used, and the multilayer film formed on other face than the inclined face has an antireflective function for light to be used.

The light incident end and/or emission end of the optical block means the part of the optical block, which functions at least as one of the light incident end or the light emission end in the optical block at the time of transmitting/receiving optical information (it is also the same hereinafter).

With the first aspect of the present invention, it is possible to have a wavelength selecting function corresponding to the function of an optical filter by forming the multilayer film on the optical block. Thus, a complicated work for placing the optical filter on the optical block can be omitted.

Further, the multilayer film can be formed by using a film-forming method so that it is also applicable for a small-size optical block.

Furthermore, a different optical function such as a wavelength selecting function corresponding to the function of the optical filter or an antireflective function corresponding to the function of an antireflection coating can be provided to the multilayer films of the same structure formed on the optical block depending on the formed positions. Thereby, it allows prevention of deterioration in the optical property which may be caused due to presence of the multilayer films.

Moreover, it becomes possible to form a member corresponding to the optical filter and a member corresponding to the antireflection coating simultaneously by the multilayer films of the same structure.

As a result, it is possible to achieve more reduction in the number of components, downsizing, low cost, and an improvement in the mass-productivity while maintaining an excellent optical property.

An optical element of a second aspect of the present invention is the optical element according to the first aspect of the present invention, wherein the multilayer films are shortwave pass filters that satisfy each of following conditional expressions (1) and (2):

[Case of Multilayer Film formed on Other Face than Inclined Face]

$$\lambda_1 < \lambda_2 < \lambda_{T50\%} < \lambda_0 \qquad (1)$$

[Case of Multilayer Film formed on Inclined Face]

$$\lambda_1 < \lambda_{TP50\%} \text{ and } \lambda_{TS50\%} < \lambda_2 < \lambda_0 \qquad (2)$$

where, $\lambda_1$: center wavelength of a first light to be used $\lambda_2$: canter wavelength of a second light to be used $\lambda_{T50\%}$: wavelength of non-polarization light with which transmittance for multilayer film becomes 50%

$\lambda_0$: reflection-zone center wavelength $\lambda_{TP50\%}$: wavelength of P-polarization light with which transmittance for multilayer film becomes 50%

$\lambda_{TS50\%}$: wavelength of S-polarization light with which transmittance for multilayer film becomes 50%

In the second aspect of the present invention, the multilayer films formed on the faces other than the inclined face are the shortwave pass filters that satisfy the conditional expression (1). This allows the multilayer films formed on the other faces than the inclined face to have a better antireflective function for the light to be used. Further, since the multilayer film formed on the inclined face is the shortwave pass filter that satisfies the conditional expression (2), it allows the multilayer film formed on the inclined face to have a better wavelength selecting function for the light to be used. As a result, the optical property can be more improved.

Further, an optical element according to a third aspect of the present invention is the optical element according to the first or second aspect, wherein a plurality of the cavity parts are formed in the optical block.

With the third aspect of the present invention in which the number of the cavity parts is increased, a desired optical path can be easily designed by effectively utilizing a difference between the refractive indexes of the cavity part and other part in the optical block. As a result, the incident angle of light for the optical element and the emission angle of the light therefrom can be made the same, for example, thereby achieving more downsizing. Furthermore, then umber of the multilayer films with the wavelength selecting function can be increased so that it becomes possible to flexibly correspond to transmission/reception of optical information using light of more various wavelengths.

An optical element according to a fourth aspect of the present invention is the optical element according to the first or second aspect, wherein a lens made of the same material as that of the optical block is formed integrally with the optical block at the light incident end and/or emission end of the optical block.

With the fourth aspect of the present invention, it is possible to manufacture the lens and the optical block simultaneously by the same material and to omit a work for adjusting the positions of the lens and the optical block. As a result, a low-cost optical element that is more suitable for mass-production can be achieved.

An optical element according to a fifth aspect of the present invention is the optical element according to the first or second aspect, wherein: a plurality of the light incident ends and/or emission ends of the optical block are formed in the optical block; and a first holding part for holding a photoelectrical conversion element or a second holding part for holding an edge of an optical transmission path is formed integrally with the optical block by the same material at each of the light incident ends and/or emission ends.

With the fifth aspect of the present invention, the optical block, the first holding part, and the second holding part can be formed simultaneously by the same material. As a result, a low-cost optical element that is more suitable for mass-production can be achieved.

An optical element according to a sixth aspect of the present invention is the optical element according to the first or second aspect, wherein the multilayer film is formed over the entire surface of the optical block.

With the sixth aspect of the present invention, it is possible to save the time needed for forming the multilayer film by selecting a specific surface of the optical block. As a result, a low-cost optical element that is more suitable for mass-production can be achieved, With the optical element according to the present invention, it is possible to achieve more reduction in the number of components, downsizing, low cost, and an improvement in the mass-productivity while maintaining an excellent optical property.

DETAILED DESCRIPTION OF THE PREFERRED EMBODIMENTS

First Embodiment

A first embodiment of an optical element according to the present invention will be described hereinafter by referring to FIG. 1.

Figure 1:
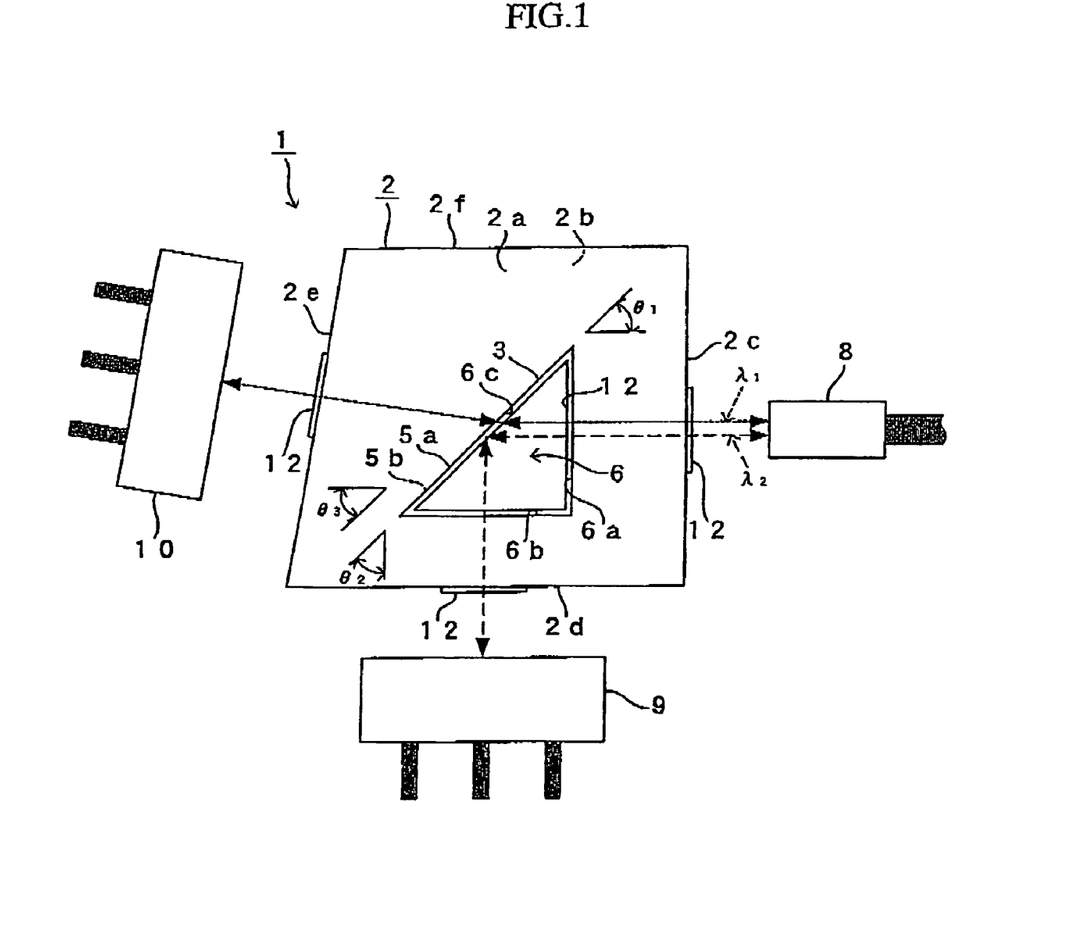
FIG. 1 is an illustration for showing the principle of a first embodiment of an optical element according to the present invention.

FIG. 1 shows an illustration for describing an optical element 1 of the embodiment. As shown in FIG. 1, the optical element 1 of the embodiment comprises a trapezoid optical block 2 with a prescribed thickness in a direction perpendicular to the paper face of FIG. 1. The optical block 2 is formed by the same resin material, and the optical material 2 can be integrally molded by ejection molding.

Examples of the resin material for forming the optical block 2 may be polyether imide (PEI), cycloolefin polymer, polycarbonate, etc.

Hereinafter, a face (front face) of the optical block 2 on the front side with respect to the paper face of FIG. 1 is referred to as a first face 2a, the back face thereof as a second face 2b, the right-side face in FIG. 1 as a third face 2c, the lower-side face as a fourth face 2d, the left-side face as a fifth face 2e, and the upper-side face as a sixth face 2f for convenience's sake.

From the first face 2a to the second face 2b of the optical block 2, there is formed a planar right-triangular through hole 3 that is orthogonal to each of the faces 2a, 2b.

This through hole 3 forms a right-triangular cavity part 6 with two openings, one of which is an opening 5a formed on the first face 2a and the other is an opening 5b formed on the second face 2b.

The internal face of the cavity part 6 is formed with a first face 6a and a second face 6b, which are orthogonal to each other in an adjacent state, and a third face (referred to as an inclined face 6c) that is adjacent to both faces 6a and 6b making an acute angle between the two faces 6a and 6b.

The first face 6a in the internal face of the cavity part 6 faces the third face 2c of the optical block 2 in parallel through the resin material of the optical block 2. Further, the second face 6b in the internal face of the cavity part 6 faces the fourth face 2d of the optical block 2 through the resin material of the optical block 2. Furthermore, the inclined face 6c in the internal face of the cavity part 6 faces the fifth face 2e of the optical block 2 in an inclined state through the resin material of the optical block 2.

Further, as shown in FIG. 1, the inclined face 6c has a prescribed inclining angle $\theta_1$ with respect to a traveling direction of light that travels on the optical path between the inclined face 6c and an optical fiber 8 disposed as an optical transmission path on the outer side (right side of FIG. 1) of the third face 2c of the optical block 2.

Furthermore, the inclined face 6c has a prescribed inclining angle $\theta_2$ with respect to a traveling direction of light that travels on the optical path between the inclined face 6c and a first photoelectric conversion element 9 disposed on the outer side (lower side of FIG. 1) of the fourth face 2d of the optical block 2.

Moreover, the inclined face 6c has a prescribed inclining angle $\theta_3$ with respect to a traveling direction of light that travels on the optical path between the inclined face 6c and a second photoelectric conversion element 10 disposed on the outer side (left side of FIG. 1) of the fifth face 2e of the optical block 2.

The first photoelectric conversion element 9 and the second photoelectric conversion element 10 may be provided with both a light-emitting device and a light-receiving device or either one of the devices.

In the embodiment, a multilayer film 12 is formed on the entire faces 6a, 6b, and 6c in the internal face of the cavity part 6.

Further, a multilayer film 12 in the same structure as that formed on the internal face of the cavity part 6 is formed on a specific range of the third face 2c of the optical block 2 facing towards the optical fiber 8, as an interface between the light incident end and/or emission end of the optical block 2 and outside.

Furthermore, a multilayer film 12 in the same structure as that formed on the internal face of the cavity part 6 is formed on a specific range of the fourth face 2d of the optical block 2 facing towards the first photoelectrical conversion element 9, as an interface between the light incident end and/or emission end of the optical block 2 and outside.

Moreover, a multilayer film 12 in the same structure as that formed on the internal face of the cavity part 6 is formed on a specific range of the fifth face 2e of the optical block 2 facing towards the second photoelectrical conversion element 10, as an interface between the light incident end and/or emission end of the optical block 2 and outside.

Among those multilayer films 12, the multilayer film 12 formed on the inclined face 6c in the internal face of the cavity part 6 has a wavelength selecting function that reflects or transmits light by selecting the wavelength of light with the center wavelength of $\lambda_1$=980 nm as the first light to be used and light with the center wavelength of $\lambda_2$=1310 nm as the second light to be used.

Specifically, when the light with the center wavelength of $\lambda_1$=980 nm (referred to as the first use light hereinafter) makes incidence from the optical fiber 8 side, the multilayer film 12 formed on the inclined face 6c transmits the first use light to the second photoelectrical conversion element 10 side. Inversely, when the first use light emitted by the light-emitting device makes incidence from the second photoelectrical conversion element 10 side, the multilayer film 12 transmits the first use light to the optical fiber 8 side.

This allows the optical fiber 8 and the second photoelectrical conversion element 10 to be optically coupled, thus enabling to perform single-core bidirectional transmission/reception of optical information using the first use light. The first use light is slightly refracted when transmitting the multilayer film 12 formed on the inclined face 6c due to the difference in the refractive indexes of an air layer of the cavity part 6, the multilayer film 12, and the resin material of the optical block 2. However, through setting the positions of the second photoelectrical conversion element 10 and the optical fiber 8 in view of that condition, the optical fiber 8 and the second photoelectrical conversion element 10 can be coupled appropriately.

Further, when the light with the center wavelength of $\lambda_2$=1310 nm (referred to as the second use light hereinafter) makes incidence from the optical fiber 8 side, the multilayer film 12 formed on the inclined face 6c reflects the second use light to the first photoelectrical conversion element 9 side. Inversely, when the second use light emitted by the light-emitting device makes incidence from the first photoelectrical conversion element 9 side, the multilayer film 12 reflects the second use light to the optical fiber 8 side.

This allows the optical fiber 8 and the first photoelectrical conversion element 9 to be optically coupled, thus enabling to perform single-core bidirectional transmission/reception of optical information using the second use light.

In the meantime, as the multilayer films 12 formed on the faces other than the inclined face 6c, the multilayer film 12 formed on the first face 6a in the internal face of the cavity part 6 and the multilayer film 12 formed on a certain range of area of the third face 2c of the optical block 2 facing towards the optical fiber 8 have an antireflective function for both the first use light and the second use light transmitting through each of the multilayer films 12.

Further, as the multilayer film 12 formed on the face other than the inclined face 6c, the multilayer film 12 formed on a certain range of area of the fifth face 2e of the optical block 2 facing towards the second photoelectrical conversion element 10 has an antireflective function for the first use light that transmits through the multilayer film 12.

Furthermore, as the multilayer films 12 formed on the faces other than the inclined face 6c, the multilayer film 12 formed on the second face 6b in the internal face of the cavity part 6 and the multilayer film 12 formed on a certain range of area of the fourth face 2d of the optical block 2 facing towards the first photoelectrical conversion element 9 have an antireflective function for the second use light that transmits through each of the multilayer films 12.

These multilayer films 12 formed on the inclined face 6c and the faces other than the inclined faces 6c may be formed by alternately and repeatedly laminating a thin film of high-refractive substance as a dielectric substance and a thin film of low-refractive substance as a dielectric substance, for example. Examples of the high-refractive substance to be used may be $TiO_2$, $Ta_2O_5$, $HfO_2$, etc. Examples of the low-refractive substance to be used may be $Al_2O_3$, $SiO_2$, etc.

The multilayer films 12 formed on the inclined face 6c and other faces can be formed simultaneously by using the same film-forming material through a film-forming method such as atomic layer deposition (ALD).

In the embodiment, the multilayer films 12 are formed on the optical block 2 in the manner as described above, which is possible to provide a wavelength selecting function that corresponds to an optical filter. Therefore, it is possible to omit a complicated work for providing a separate optical filter to the optical block 2 as required in the conventional case. Further, the multilayer films 12 can be formed by a film-forming method so that it is also applicable for a small-size optical block 2. Furthermore, since the multilayer films 12 of the same structure formed on the optical block 2 can be provided with a different optical function such as a wavelength selecting function or an antireflective function depending on the formed positions, presence of the multilayer films 12 formed on the faces other than the inclined face 6c does not cause deterioration in the optical property of the optical element 1. Moreover, it becomes possible to form a member corresponding to an optical filter and a member corresponding to an antireflection coating simultaneously by the multilayer films 12 of the same structure.

As a result, it is possible to achieve more reduction in the number of components, downsizing, low cost, and an improvement in the mass-productivity while maintaining an excellent optical property.

In addition to the above-described structure, in the embodiment, the multilayer films 12 are to satisfy each of the following conditional expressions (1) and (2).

[Case of Multilayer Film 12 formed on Faces other than Inclined Face 6c]

$$\lambda_1 < \lambda_2 < \lambda_{T50\%} < \lambda_0 \quad (1)$$

[Case of Multilayer Film 12 formed on Inclined Face 6c]

$$\lambda_1 < \lambda_{TP50\%} \text{ and } \lambda_{TS50\%} < \lambda_2 < \lambda_0 \quad (2)$$

where, in the expressions (1) and (2), $\lambda_1$ is the center wavelength (980 nm) of the above-described first use light, and $\lambda_2$ is the center wavelength (1310 nm) of the above-described second use light.

In the expressions (1) and (2), $\lambda_0$ is the reflection-zone center wavelength, i.e. the center wavelength of light that is completely reflected by the multilayer film 12. The reflection-zone center wavelength takes different values in accordance with the light incident angle with respect to the multilayer film 12 even though the film structures (film material, number of layers, film thickness, etc) of the multilayer films 12 are the same. For example, when the angle of incident light with respect to a plane normal of the multilayer film 12 is 0° (0° incident), $\lambda_0$ becomes about 1550 nm. When the angle of incident light with respect to a plane normal of the multilayer film 12 is 45° (45° incident), $\lambda_0$ becomes about 1400 nm. When these examples are applied to the expressions (1) and (2), as can be seen from FIG. 1, the incident angle for the multilayer films 12 formed on the faces other than the inclined face 6c can be considered as almost 0° incident, so that $\lambda_0$ is about 1550 nm. The incident angle for the multilayer film 12 formed on the inclined face 6c can be considered as almost 45° incident provided that the inclining angles $\theta_1, \theta_2, \theta_3$ of the inclined face are 45±5°, so that $\lambda_0$ is about 1400 nm.

Further, $\lambda_{T50\%}$ in the expression (1) indicates the wavelength of non-polarization light with which the transmittance becomes 50% in the multilayer films 12 formed on the faces other than the inclined face 6c.

Furthermore, $\lambda_{TP50\%}$ in the expression (2) indicates the wavelength of P-polarization light (light oscillating in a plane formed between the incident direction of the incident light and the normal direction of the incident face) with which the transmittance becomes 50% in the multilayer film 12 formed on the inclined face 6c, and $\lambda_{TS50\%}$ indicates the wavelength of S-polarization light (light oscillating in a plane perpendicular to the P-polarization light) with which the transmittance becomes 50% in the multilayer film 12 formed on the inclined face 6c.

The expression (1) indicates the condition for providing an antireflective function to the multilayer films 12 formed on other faces than the inclined face 6c with respect to the first use light and the second use light. That is, the expression (1) indicates that the multilayer films 12 formed on the faces other than the inclined face 6c can transmit the non-polarization first and second use light making incident on the multilayer films 12 by an excellent transmittance.

By satisfying the expression (1), the multilayer films 12 formed on other faces than the inclined face 6c can be provided with a better antireflective function for the first use light and the second use light. As a result, the optical property can be more improved.

In the meantime, the expression (2) indicates the condition for providing a wavelength selecting function to the multilayer film 12 formed on the inclined face 6c with respect to the first use light and the second use light. That is, the expression (2) indicates that the multilayer film 12 formed on the inclined face 6c can transmit the P-polarization or S-polarization first use light making incident on the multilayer film 12 by an excellent transmittance. In addition, the expression (2) indicates that the multilayer film 12 formed on the inclined face 6c can reflect the P-polarization or S-polarization second use light making incident on the multilayer film 12 by an excellent reflectance.

By satisfying the expression (2), the multilayer film 12 formed on the inclined face 6c can be provided with a better wavelength selecting function for the first use light and the second use light. As a result, the optical property can be more improved.

Further, in the case where the inclining angle of the inclined face 6c is 45°, use of light that is collimated to be approximately 45°±5° can provide a preferable angle for the multilayer film 12 formed on the inclined face 6c to have the wavelength selecting function. As a result, the optical element 1 with a better optical property can be achieved. Moreover, by simultaneously forming a shortwave pass filter (SWPF) like the multilayer film 12 of the embodiment on the optical block 2, it is possible to provide the optical element 1 with excellent mass-productivity.

Second Embodiment

Next, a second embodiment of the optical element according to the present invention will be described by referring to FIG. 2-FIG. 7 especially focusing on differences between that of the first embodiment. Components with the same basic structures as those of the first embodiment or similar to those will be described by applying the same reference numerals.

Figure 2:
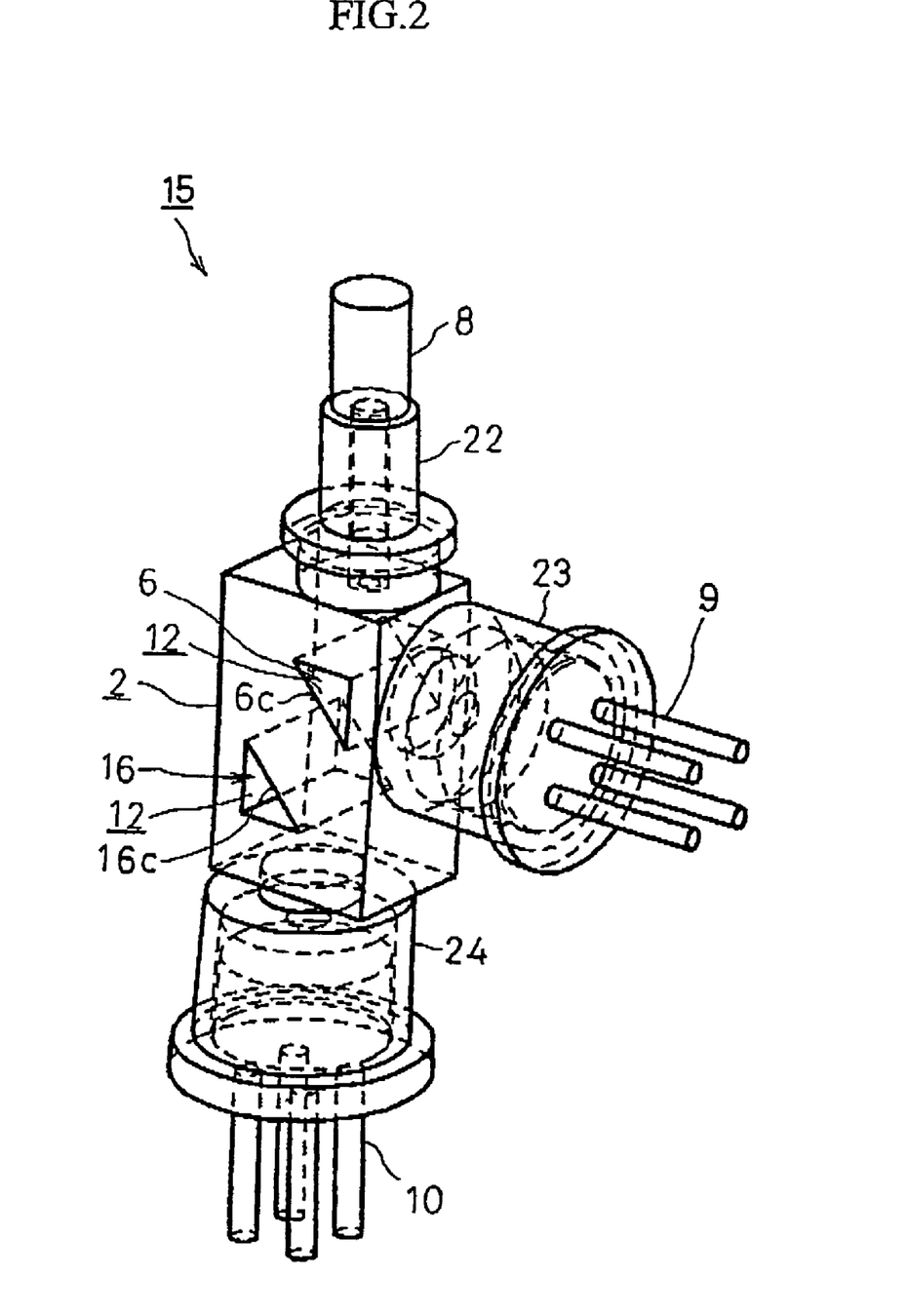
FIG. 2 is a perspective view for showing a second embodiment of the optical element according to the present invention.
Figure 3:
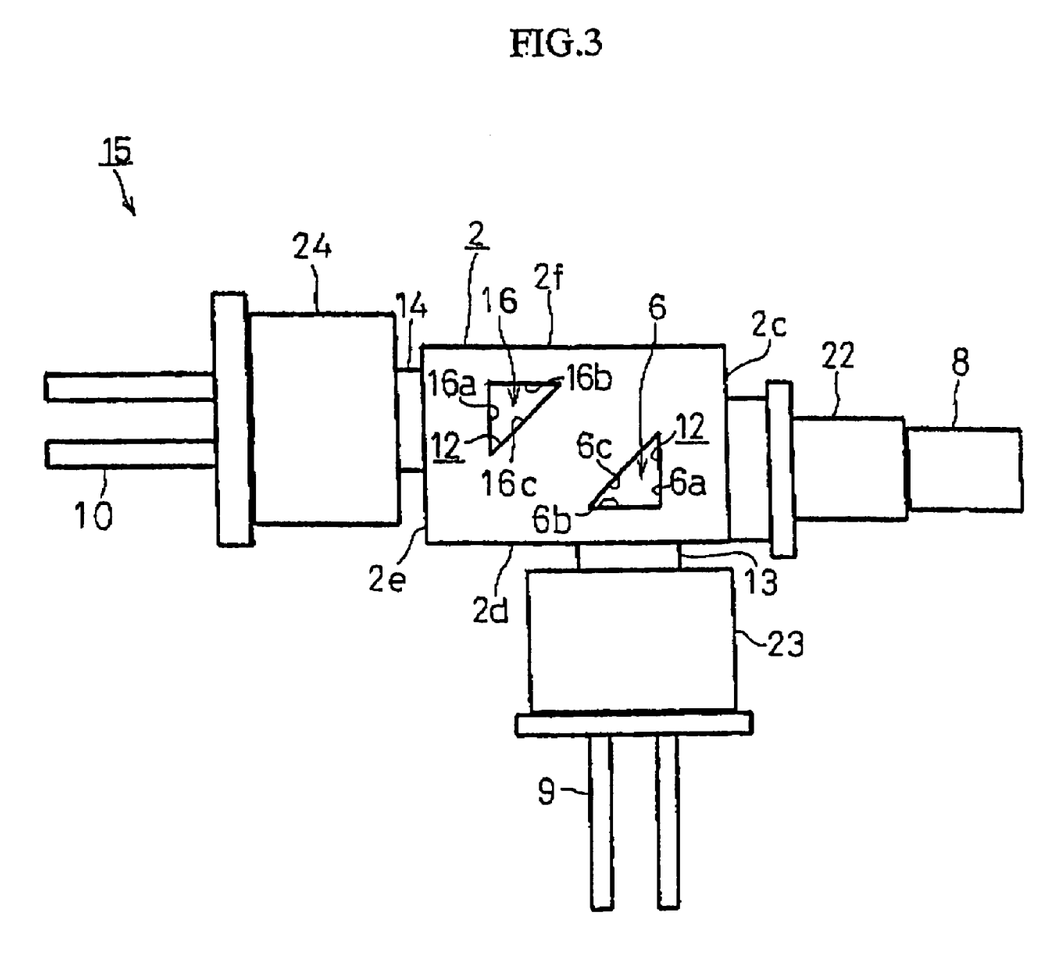
FIG. 3 is a front elevational view for showing the second embodiment of the optical element according to the present invention.
Figure 4:
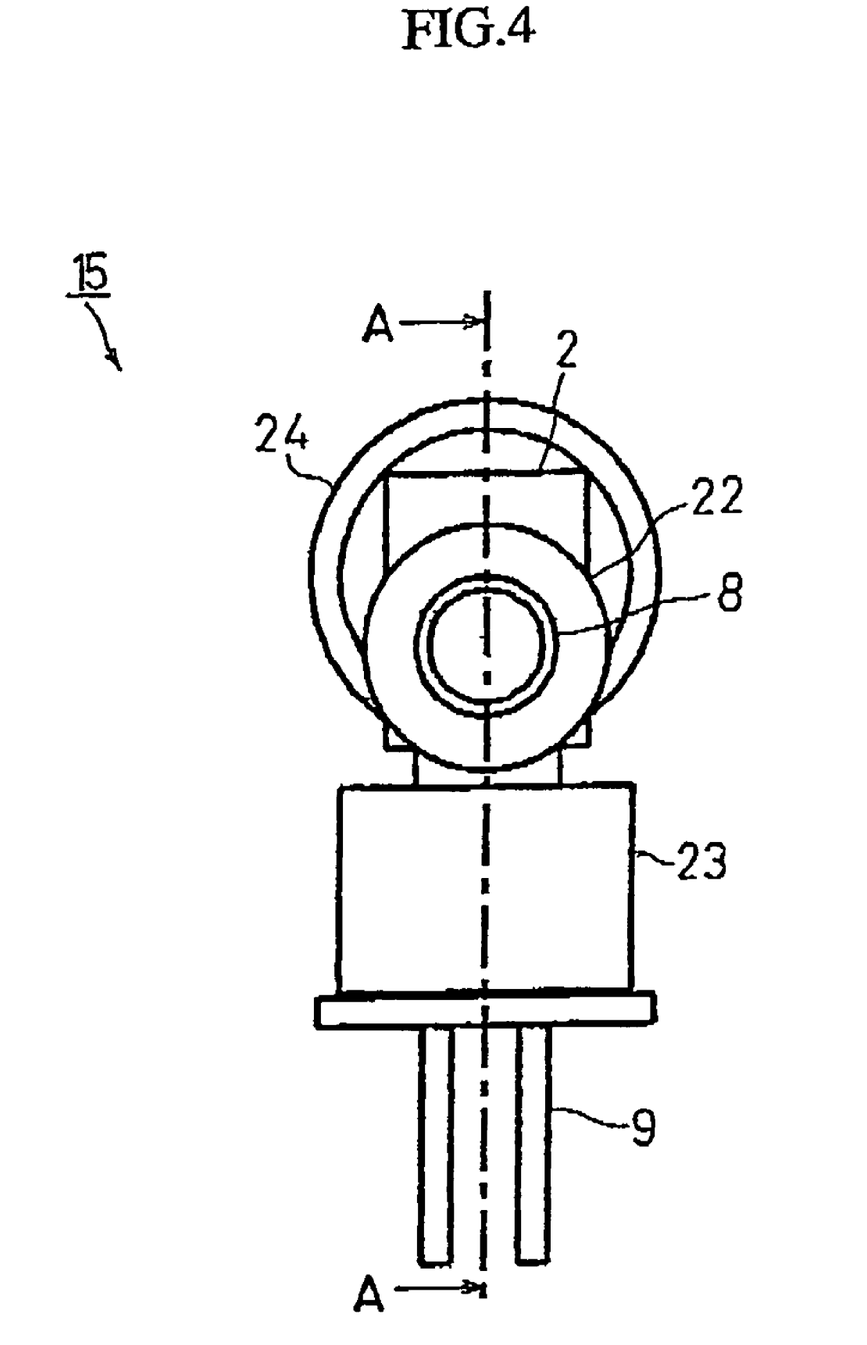
FIG. 4 is a right-side view of FIG. 3.
Figure 5:
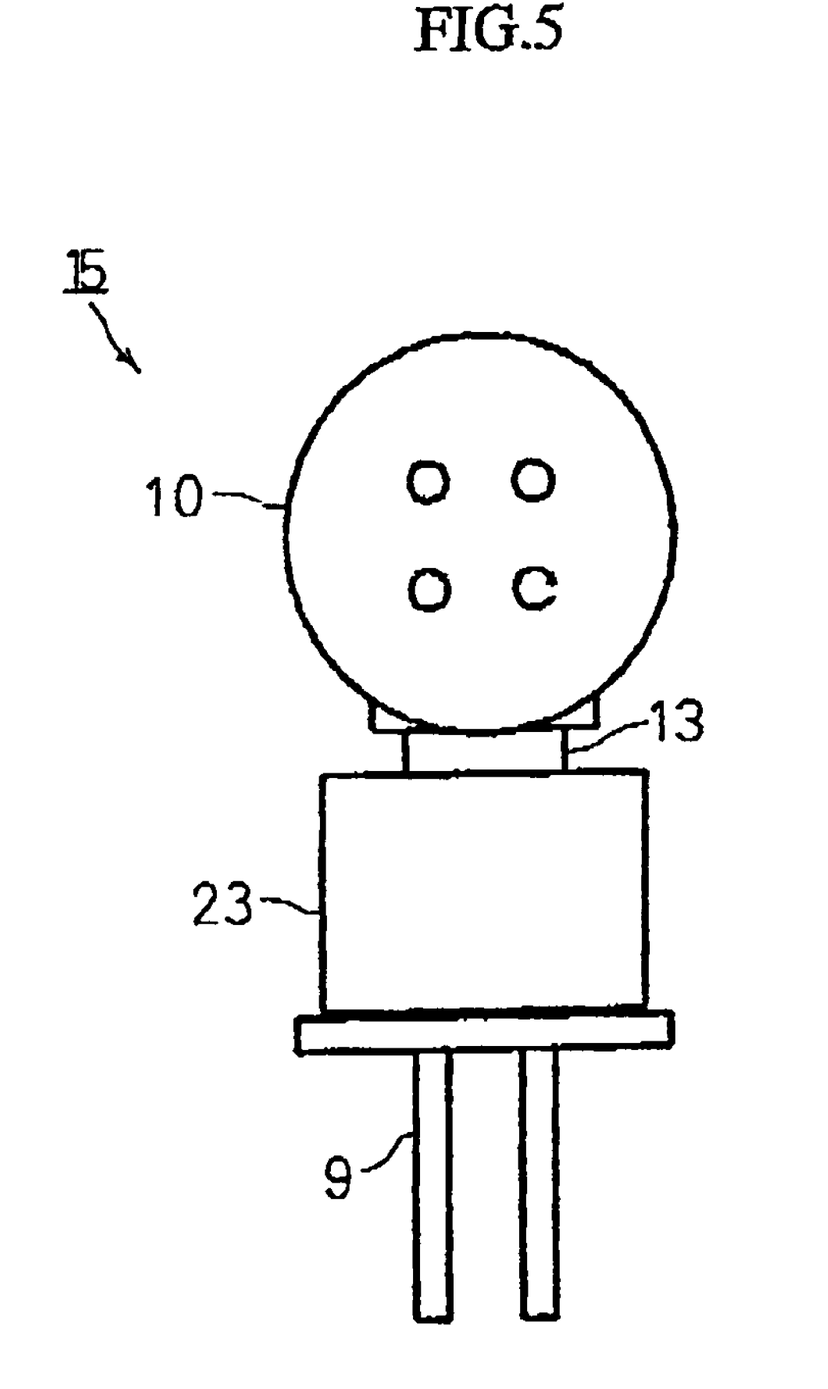
FIG. 5 is a left-side view of FIG. 3.
Figure 6:
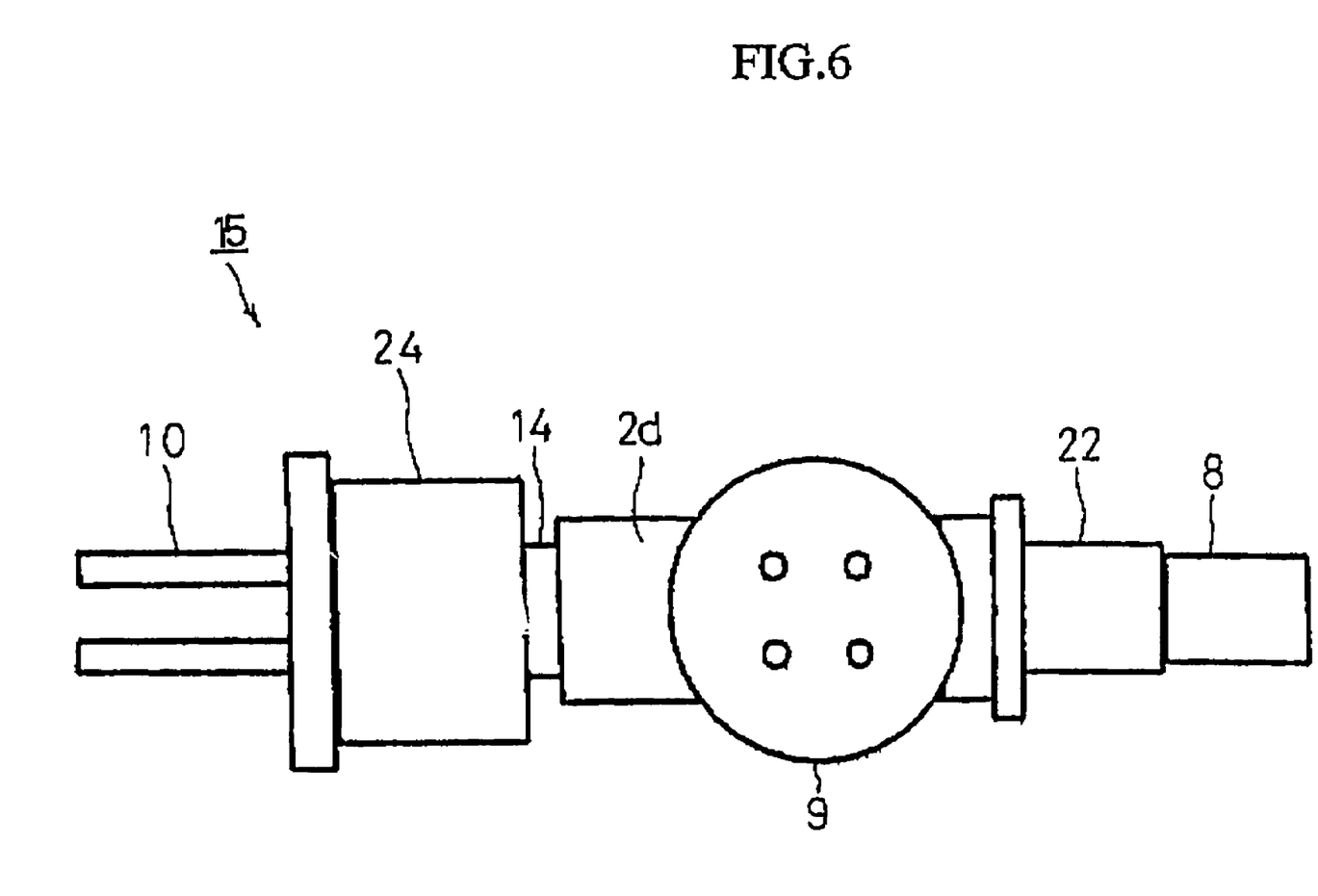
FIG. 6 is a lower-side view of FIG. 3.
Figure 7:
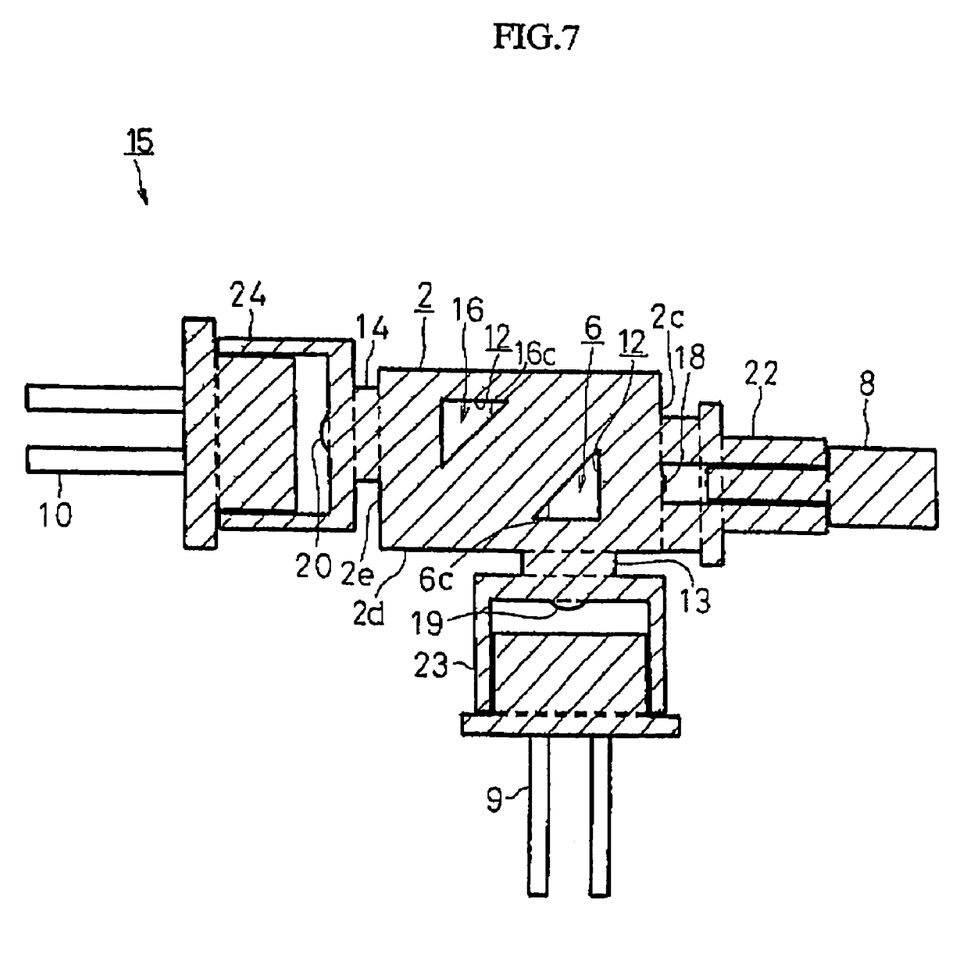
FIG. 7 is a cross section taken along the line A-A of FIG. 4.

FIG. 2 is a perspective view for showing an optical element 15 of this embodiment. FIG. 3 is a front elevational view viewing the optical element 15 from the same direction as that of FIG. 1. FIG. 4 is a right-side view of FIG. 3, FIG. 5 is a left-side view of FIG. 3, and FIG. 6 is a lower-side view of FIG. 3. FIG. 7 is a cross section taken along the line A-A of FIG. 4.

As shown in FIG. 2, FIG. 3, and FIG. 7, the optical element 15 of the embodiment comprises not only a cavity part 6 with the same multilayer film 12 as that of the first embodiment in an optical block 2, but also a second cavity part 16 of the same shape as that of the cavity part 6 formed on the optical path between the cavity part 6 and a second photoelectrical conversion element 10.

An-inclined face 16c in the internal face of the second cavity part 16 faces an inclined face 6c of the cavity part 6 in parallel through the resin material of the optical block 2. Further, a first face 16a in the internal face of the second cavity part 16 faces a fifth face 2e of the optical block 2 in parallel through the resin material of the optical block 2. Furthermore, a second face 16b of the second cavity part 16 faces a sixth face 2f of the optical block 2 through the resin material of the optical block 2.

Like the cavity part 6, the second cavity part 16 also has multilayer films 12 of the same structure as those formed on the internal face of the cavity part 6 formed over the entire surfaces 16a, 16b, 16c of the internal face.

The multilayer film 12 formed on the inclined face 16c of the second cavity part 16 has a wavelength selecting function for the first use light.

Specifically, the multilayer film 12 formed on the inclined face 16c transmits the first use light to the second photoelectrical conversion element 10 side when the first use light makes incidence from an optical fiber 8 side through the cavity part 6. Inversely, the multilayer film 12 transmits the first use light to the cavity part 6 side when the first use light emitted by a light-emitting device makes incidence from the second photoelectrical conversion element 10 side.

As described above, the first use light is slightly refracted when transmitting through the multilayer film 12 that is formed on the inclined face 6c of the cavity part 6.

The second cavity part 16 refracts the first use light making incidence from the cavity part 6 side towards the inverse direction of the refracting direction of the cavity part 6 by utilizing the difference between the refractive index of the second cavity part (air layer) 16 and that of sections 2, 12 other than the second cavity part 16.

With this, the incident angle of the first use light with respect to the third face 2c of the optical block 2 and the emission angle of the first use light from the fifth face 2e of the optical block 2 can be made the same angle (0° with respect to the plane normal of the third face 2c and that of the fifth face 2e).

As a result, as shown in FIG. 3, the optical fiber 8, the optical block 2, and the second photoelectrical conversion element 10 can be arranged in line. Thus, in addition to the effect of the optical element 1 of the first embodiment, a more compact structure can be achieved.

In the meantime, the multilayer film 12 formed on the first face 16a of the second cavity part 16 has an antireflective function for the first use light making incidence from the inclined face 16c side or for the first use light making incidence from the second photoelectrical conversion element 10 side. Therefore, the multilayer film 12 formed on the first face 16a allows more improvement in the optical property when performing transmission and reception of optical information using the first use light.

As shown in FIG. 7, the embodiment has a first lens 18 made of the same resin material as that of the optical block 2 formed integrally with the optical block 2 within a certain range of area that faces the optical fiber 8 in the third face 2c of the optical block 2 as an interface between the light incident end and/or emission end of the optical block 2 and outside.

The first lens 18 defines the traveling directions of the first use light and the second use light that travel on the optical path between the inclined face 6c and the optical fiber 8.

Further, as shown in FIG. 7, a second lens 19 made of the same resin material as that of the optical block 2 is formed integrally with the optical block 2 on a top end face of a first convex part 13 that is formed on the fourth face 2d of the optical block 2 as an interface between the light incident end and/or emission end of the optical block 2 and outside.

The second lens 19 defines the traveling direction of the second use light that travels on the optical path between the inclined face 6c and the first photoelectrical conversion element 9.

Further, as shown in FIG. 7, a third lens 20 made of the same resin material as that of the optical block 2 is formed integrally with the optical block 2 on a top end face of a second convex part 14 that is formed on the fifth face 2e of the optical block 2 as an interface between the light incident end and/or emission end of the optical block 2 and outside.

The third lens 20 defines the traveling direction of the first use light that travels on the optical path between the inclined face 16c and the second photoelectrical conversion element 10.

Therefore, in the embodiment, it is possible to manufacture the lenses 18, 19, 20 and the optical block 2 simultaneously by the same resin material and, in addition, it becomes possible to omit the work for adjusting the positions of the lenses 18, 19, 20 and the optical block 2. As a result, it is possible to achieve the optical element of low cost, which is more suitable for mass-production.

Furthermore, as shown in FIG. 7, the embodiment has a cylindrical optical fiber holding part 22 as a second holding part formed by surrounding the first lens 18 on the third face 2c of the optical block 2 as the light incident end and/or emission end of the optical block 2. The edge of the optical fiber 8 is held to the optical fiber holding part 22.

Moreover, as shown in FIG. 7, a cylindrical first photoelectrical conversion element holding part 23 as a first holding part is formed by surrounding the second lens 19 in the first convex part 13 that is the light incident end and/or emission end of the optical block 2. The first photoelectrical conversion element 9 is held to the first photoelectrical conversion element holding part 23.

Further, as shown in FIG. 7, a cylindrical second photoelectrical conversion element holding part 24 as a first holding part is formed by surrounding the third lens 20 in the second convex part 14 that is the light incident end and/or emission end of the optical block 2. The second photoelectrical conversion element 10 is held to the second photoelectrical conversion element holding part 24.

Therefore, in the embodiment, it is possible to form the optical block 2, the optical fiber holding part 22, the first photoelectrical conversion element holding part 23, and the second photoelectrical conversion element holding part 24 simultaneously by the same resin material. As a result, it is possible to achieve the optical element of low cost, which has more excellent mass-productivity.

EXAMPLES

Next, Examples of the present invention will be described by referring to FIG. 8-FIG. 12.

Example 1

Figure 8:
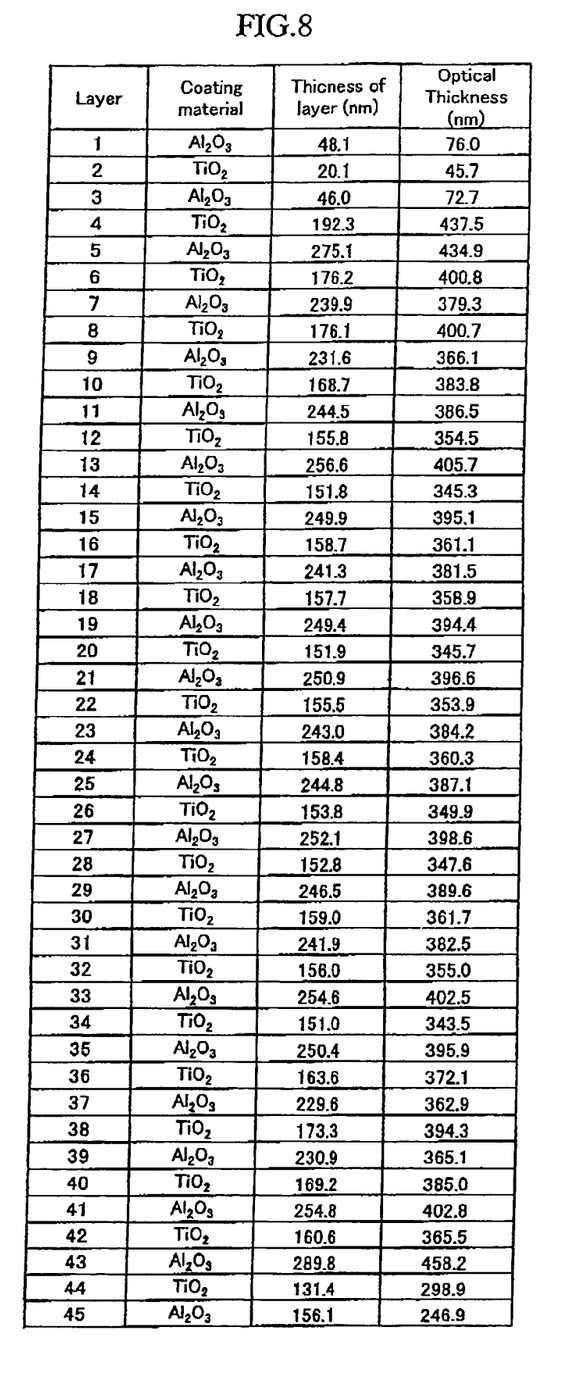
FIG. 8 is a table for showing data regarding the structure of a multilayer film in Example 1 of the optical element according to the present invention.

As shown in FIG. 8, a multilayer film 12 of Example 1 had a total of forty-five layers that are formed by alternately and repeatedly laminating $TiO_2$ thin films and $Al_2O_3$ thin films by ALD on an optical block 2 made of polyether imide.

The film thickness and the optical film thickness of the thin films in each layer were set as in FIG. 8. In FIG. 8, the film thickness is a physical thickness of the thin film. In FIG. 8, the optical film thickness is obtained in a following manner: the film thickness that is converted with the wavelength of light in vacuum as a reference (i.e. physical thickness of the thin film) is multiplied by the refractive index of the film material with a reference wavelength.

The $TiO_2$ thin film was formed by chemical reaction using $TiCl_4$ (titanium tetrachloride) and $H_2O$ (water) as materials through introducing gases of both materials into a chamber alternately and intermittently. Meanwhile, the $Al_2O_3$ thin film was formed by chemical reaction using TMA (trimethyl aluminum) and $H_2O$ (water) as materials through introducing gases of both materials into a chamber alternately and intermittently.

For the film-forming rate of the $TiO_2$ thin film when forming the multilayer film 12, the film thickness of $TiO_2$ formed in each chemical reaction cycle was about 0.045 nm. In the meantime, the film-forming rate of the $Al_2O_3$ thin film when forming the multilayer film 12 was about 0.1 nm for each chemical reaction cycle.

Further, the total number of chemical reaction cycles needed for forming the $TiO_2$ thin films of the whole layers was about 68500 cycles, while the total number of chemical reaction cycles needed for forming the $Al_2O_3$ thin film was about 47300 cycles.

Figure 9:
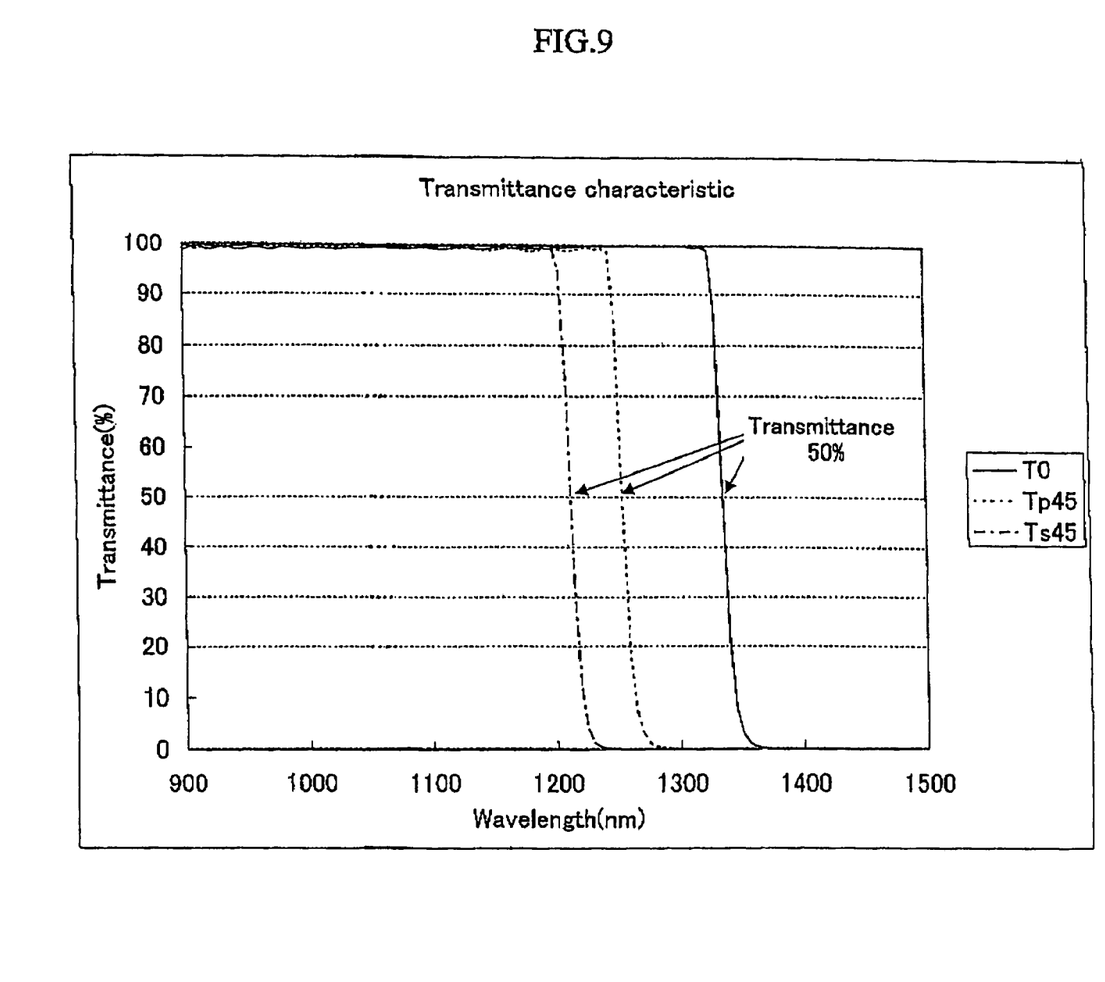
FIG. 9 is a graph for showing the transmittance characteristic of the multilayer film in Example 1 of the optical element according to the present invention.

The multilayer film 12 of Example 1 formed in this manner had the transmittance characteristic as shown in FIG. 9.

As shown by a broken line (Tp45) in a graph of FIG. 9, In Example 1, for the multilayer film 12 to which the 45° light incidence was carried out, i.e. the multilayer film 12 formed on the inclined face 6c, the wavelength $\lambda_{TP50\%}$ of about 1253 nm with which the transmittance of the P-polarization light became 50% was larger than the center wavelength 980 nm of the first use light and smaller than the center wavelength 1310 nm of the second use light.

Further, as shown by an alternate short and long dash line (Ts45) in the graph of FIG. 9, In Example 1, for the above-described multilayer film 12 to which the 45° light incidence was carried out, i.e. the multilayer film 12 formed on the inclined face 6c, the wavelength $\lambda_{TS50\%}$ of about 1211 nm with which the transmittance of the S-polarization light became 50% was larger than the center wavelength 980 nm of the first use light and smaller than the center wavelength 1310 nm of the second use light.

That is, the multilayer film 12 formed on the inclined face 6c satisfied the conditional expression (2).

This allows the multilayer film 12 formed on the inclined face 6c to transmit the first use light making incidence on the multilayer film 12 by an excellent transmittance through a wavelength selecting function and to reflect the second use light making incidence on the multilayer film 12 by an excellent reflectance.

Further, as shown in a solid line (T0) of the graph of FIG. 9, in Example 1, for the multilayer film 12 to which the 0° light incidence was carried out, i.e. the multilayer film 12 formed on other faces than the inclined face 6c, the wavelength $\lambda_{TS0\%}$ of about 1333 nm with which the transmittance of the non-polarization light became 50% was larger than the center wavelength of the first use light and the second use light and smaller than the reflection-zone center wavelength 1500 nm.

That is, the multilayer film 12 formed on the faces other than the inclined face 6c satisfied the conditional expression (1).

This allows the multilayer film 12 formed on other faces than the inclined face 6c to transmit the first use light and the second use light making incidence on the multilayer film 12 by an excellent transmittance, thus providing an excellent antireflective function.

Figure 10:
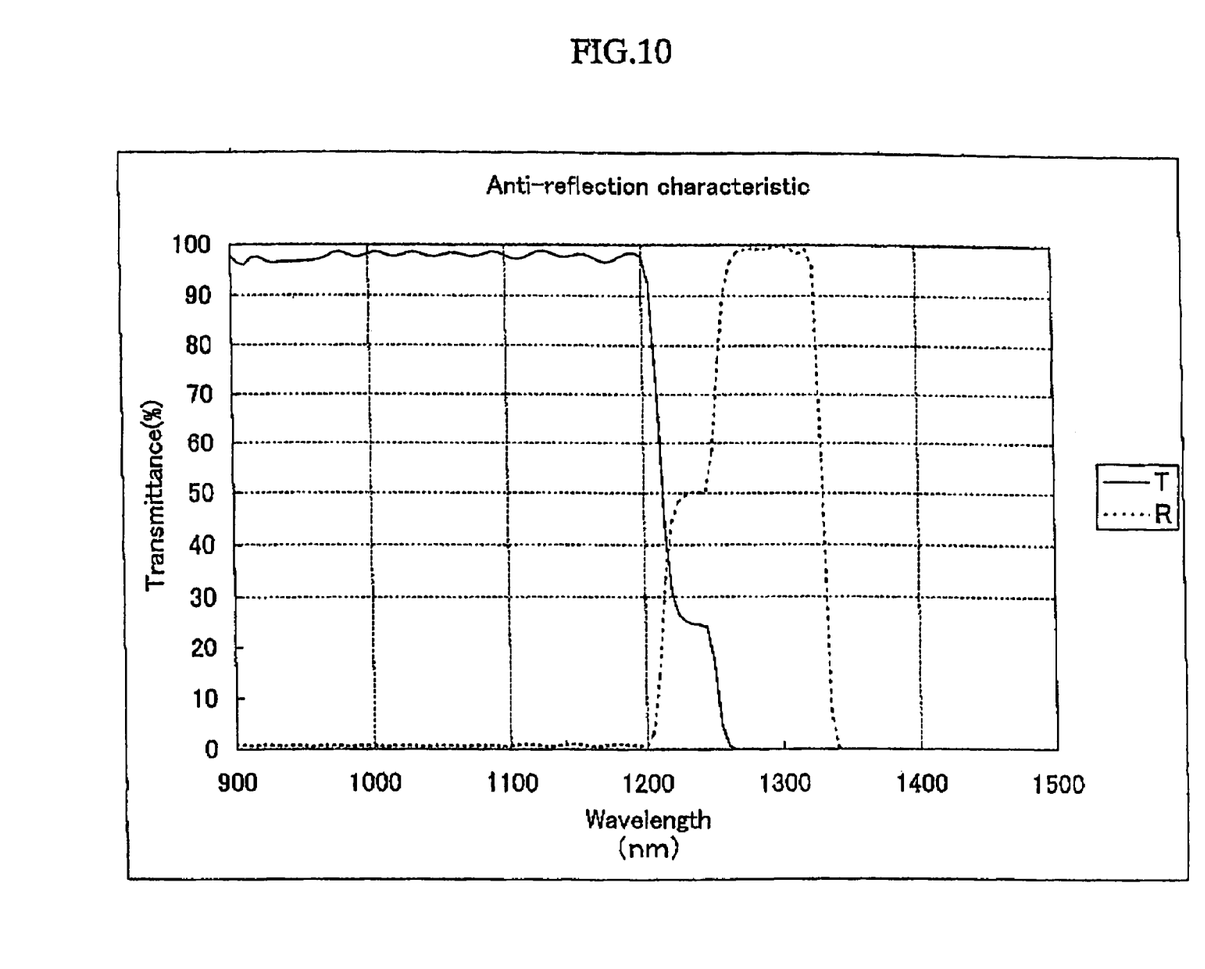
FIG. 10 is a graph for showing the antireflective characteristic of the multilayer film in Example 1 of the optical element according to the present invention.

Next, FIG. 10 shows the antireflective function of such multilayer film 12 more specifically by an illustration showing the optical properties of input light and output light to/from the optical element 15.

That is, the multilayer film 12 of Example 1 had the transmittance characteristic as shown by a solid line (T) of a graph of FIG. 10 for the first use light that is transmitted by the multilayer film 12 formed on the inclined face 6c of the optical element 15.

Furthermore, the multilayer film 12 of Example 1 had the transmittance characteristic as shown by a broken line (R) of the graph of FIG. 10 for the second use light that is reflected by the multilayer film 12 formed on the inclined face 6c of the optical element 15.

As can be seen from FIG. 10 that the multilayer film 12 of Example 1 had an excellent transmittance of more than 90% for both the first use light transmitted by the multilayer film 12 on the inclined film 6c and the second use light reflected by the multilayer film 12 on the inclined face 6c.

Accordingly, the multilayer film 12 of Example 1 was able to exhibit an excellent antireflective function for the first use light and the second use light.

Example 2

Figure 11:
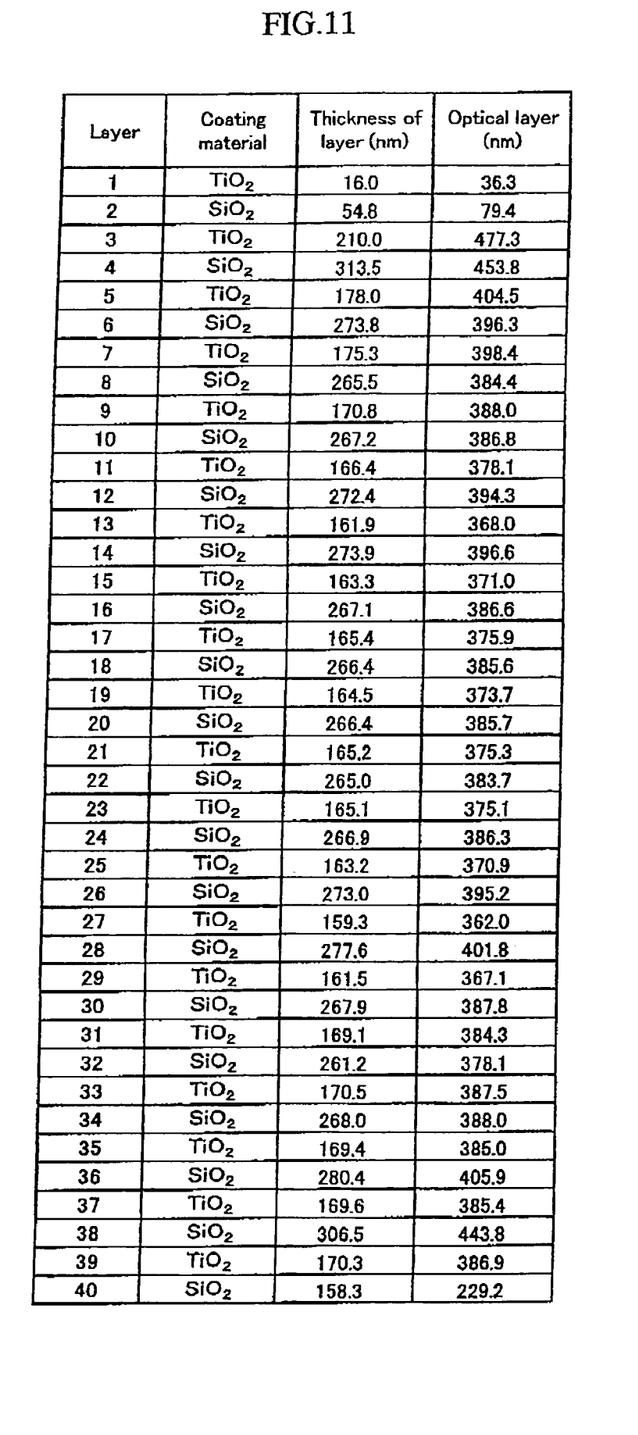
FIG. 11 is a table for showing data regarding the structure of a multilayer film in Example 2 of the optical element according to the present invention.

As shown in FIG. 11, a multilayer film 12 of Example 2 had a total of forty layers formed by alternately and repeatedly laminating $TiO_2$ thin films and $SiO_2$ thin films by ALD on an optical block 2 made of polyether imide.

The film thickness and the optical film thickness of the thin films in each layer were set as in FIG. 11.

Figure 12:
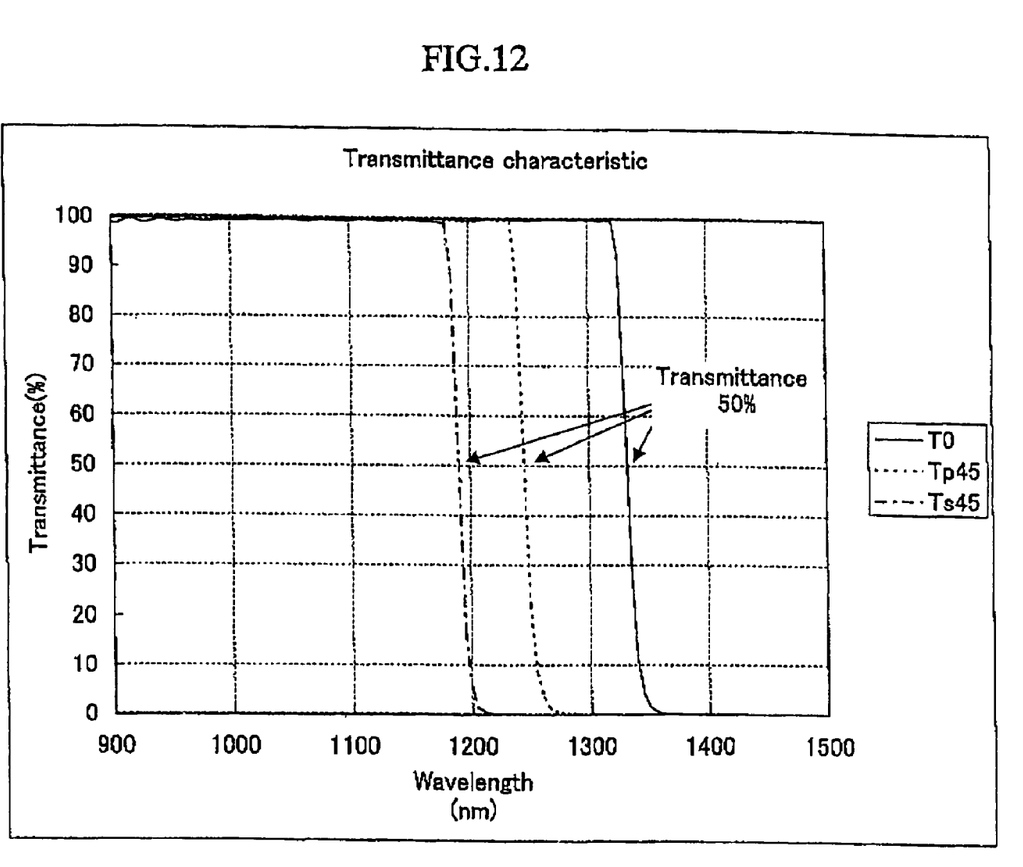
FIG. 12 is a graph for showing the transmittance characteristic of the multilayer film in Example 2 of the optical element according to the present invention.

The multilayer film 12 of Example 2 had the transmittance characteristic as shown in FIG. 12.

As shown by a broken line (Tp45) in a graph of FIG. 12, In Example 2, for the multilayer film 12 formed on the inclined face 6c to which the 45° light incidence was carried out, the wavelength $\lambda_{TP50\%}$ of about 1244 nm with which the transmittance of the P-polarization light became 50% was larger than the center wavelength 980 nm of the first use light and smaller than the center wavelength 1310 nm of the second use light.

Further, as shown by an alternate short and long dash line (Ts45) in the graph of FIG. 12, In Example 2, for the multilayer film 12 formed on the inclined face. 6c to which the 45° light incidence was carried out, the wavelength $\lambda_{TS50\%}$ of about 1194 nm with which the transmittance of the S-polarization light became 50% was larger than the center wavelength 980 nm of the first use light and smaller than the center wavelength 1310 nm of the second use light.

That is, the multilayer film 12 formed on the inclined face 6c satisfied the conditional expression (2).

This allows the multilayer film 12 formed on the inclined face 6c to transmit the first use light making incidence on the multilayer film 12 by an excellent transmittance through a wavelength selecting function and to reflect the second use light making incidence on the multilayer film 12 by an excellent reflectance.

Further, as shown in a solid line (T0) of the graph of FIG. 12, in Example 2, for the multilayer film 12 formed on other faces than the inclined face 6c to which the 0° light incidence was carried out, the wavelength $\lambda_{T50\%}$ of about 1330 nm with which the transmittance of the non-polarization light became 50% was larger than the center wavelength of the first use light and the second use light and smaller than the reflection-zone center wavelength 1500 nm.

That is, the multilayer film 12 formed on the faces other than the inclined face 6c satisfied the conditional expression (1).

This allows the multilayer film 12 formed on other faces than the inclined face 6c to transmit the first use light and the second use light making incidence on the multilayer film 12 by an excellent transmittance, thus providing an excellent antireflective function.

As described above, the optical elements 1 and 15 according to the present invention comprise the multilayer films 12 of the same structure, having a wavelength selecting function and an antireflective function that satisfy each of the conditional expressions (1) and (2). Thereby, it is possible to achieve more reduction in the number of components, downsizing, low cost, and an improvement in the mass-productivity while maintaining an excellent optical property.

The present invention is not limited to the above-described embodiments but various modifications are possible as necessary.

For example, the multilayer film 12 may be formed over the entire surface of the optical block 2. With this, it is possible to save the time for forming the multilayer film 12 by selecting a specific face of the optical block 2 and to achieve the optical element with more excellent mass-productivity. Further, formation of the multilayer film 12 over the entire surface of the optical block 2 allows prevention of moisture absorption and deterioration in the optical property of resin material.

Furthermore, it is needless to say that three or more of the cavity parts with an inclined face may be formed as necessary.

Moreover, a plurality of the optical elements 1 and 15 according to the embodiments may be connected in series. With this, it is possible to deal with transmission/reception using still more wavelengths, thereby improving the convenience.

What is claimed is:

1. An optical element with a wavelength selecting function for reflecting or transmitting light by selecting wavelength of said light, comprising:
    an optical block having a cavity part with an opening formed on an optical path and an inclined face formed in an internal face of said cavity part at a prescribed inclining angle with respect to a traveling direction of light, wherein
    multilayer films of same structure are formed at least on said internal face of said cavity part and on an interface between light incident end and/or emission end of said optical block and outside,
    said multilayer film formed on said inclined face in said internal face of said cavity part has said wavelength selecting function for light to be used,
    said multilayer film formed on other face than said inclined face has an antireflective function for light to be used; and
    said internal face of said cavity part is formed with a first face and a second face, which are orthogonal to each other in an adjacent state, and a third face adjacent to both the first and second faces and making an acute angle between the first and second faces.

2. The optical element according to claim 1, wherein said multilayer films are shortwave pass filters that satisfy each of following conditional expressions (1) and (2):
    a) case of multilayer film formed on other face than inclined face
    $$\lambda_1 < \lambda_2 < \lambda_{T50\%} < \lambda_0 \quad (1)$$
    b) case of multilayer film formed on inclined face
    $$\lambda_1 < \lambda_{TP50\%} \text{ and } \lambda_{TS50\%} < \lambda_2 < \lambda_0 \quad (2)$$
    where,
    $\lambda_1$: center wavelength of a first light to be used
    $\lambda_2$: canter wavelength of a second light to be used
    $\lambda_{T50\%}$: wavelength of non-polarization light with which transmittance for multilayer film becomes 50%
    $\lambda_0$: reflection-zone center wavelength
    $\lambda_{TP50\%}$: wavelength of P-polarization light with which transmittance for multilayer film becomes 50%
    $\lambda_{TS50\%}$: wavelength of S-polarization light with which transmittance for multilayer film becomes 50%.

3. The optical element according to claim 1 or claim 2, wherein a plurality of said cavity parts are formed in said optical block.

4. The optical element according to claim 1 or claim 2, wherein a lens made of a same material as that of said optical block is formed integrally with said optical block at said light incident end and/or emission end of said optical block.

5. The optical element according to claim 1 or claim 2, wherein:
    a plurality of said light incident ends and/or emission ends of said optical block are formed in said optical block; and
    a first holding part for holding a photoelectrical conversion element or a second holding part for holding an edge of an optical transmission path is formed integrally with said optical block by a same material at each of said light incident ends and/or emission ends.

6. The optical element according to claim 1 or claim 2, wherein said multilayer film is formed over entire surface of said optical block.

* * * * *